(12) United States Patent
Kim et al.

(10) Patent No.: US 9,569,802 B2
(45) Date of Patent: Feb. 14, 2017

(54) INVITATION MANAGEMENT BASED ON INVITEE'S BEHAVIOR

(71) Applicant: Empire Technology Development LLC, Wilmington, DE (US)

(72) Inventors: Seungil Kim, Seoul (KR); Youngil Ko, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 316 days.

(21) Appl. No.: 14/118,090

(22) PCT Filed: Apr. 17, 2013

(86) PCT No.: PCT/US2013/036986
§ 371 (c)(1),
(2) Date: Nov. 15, 2013

(87) PCT Pub. No.: WO2014/171936
PCT Pub. Date: Oct. 23, 2014

(65) Prior Publication Data
US 2014/0317026 A1 Oct. 23, 2014

(51) Int. Cl.
*G06N 5/02* (2006.01)
*G06Q 50/00* (2012.01)

(52) U.S. Cl.
CPC .............. *G06Q 50/01* (2013.01); *G06N 5/02* (2013.01)

(58) Field of Classification Search
None
See application file for complete search history.

(56) References Cited

U.S. PATENT DOCUMENTS

2010/0049534 A1 2/2010 Whitnah et al.
2012/0054278 A1 3/2012 Taleb et al.
(Continued)

FOREIGN PATENT DOCUMENTS

WO 2013016687 A1 1/2013

OTHER PUBLICATIONS

Rana, On Weighted Egocentric Graphs and Social Group Communication, Doctoral Thesis, Lulea University of Technology, Oct. 2013, pp. 1-268.*
(Continued)

*Primary Examiner* — Wilbert L Starks
(74) *Attorney, Agent, or Firm* — Brundidge & Stanger, P.C.

(57) ABSTRACT

Technologies are generally described for an invitation management scheme. In some examples, an application provider server may include an invitation request receiver unit configured to receive, from an account of a first user, a request to invite a second user to use an application; an interest determination unit configured to determine whether the second user is inclined to use the application based at least in part on behavior information regarding activity in an account of the second user that includes a number of invitations sent to the account of the second user that remain pending; a notification generation unit configured to generate an invitation to be sent to the account of the second user after the interest determination unit determines that the second user is inclined to use the application; and a notification transmitter unit configured to transmit the generated invitation to the account of the second user.

21 Claims, 7 Drawing Sheets

(56) References Cited

U.S. PATENT DOCUMENTS

2012/0233263 A1 9/2012 Fischer et al.
2012/0244948 A1 9/2012 Dhillon et al.
2012/0278262 A1 11/2012 Morgenstern et al.
2013/0013541 A1 1/2013 Juan et al.

OTHER PUBLICATIONS

International Search Report from corresponding PCT Application No. PCT/US13/36986 mailed Aug. 20, 2013.
Sonamine. Learn about predictive analytics in games. Sonamine, LLC, Jan. 30, 2013.
Joly, A. et al., Alcatel-Lucent, Context-Awareness The missing block of Social Networking. 2008.
A. Joly, et al., "Contextual Recommendation of Social Updates, a Tag-based Framework".
A. Joly, et al. "Workspace Awareness without Overload: Contextual Filtering of Social Interactions".

* cited by examiner

INVITATION MANAGEMENT BASED ON INVITEE'S BEHAVIOR

CROSS-REFERENCE TO RELATED APPLICATION

The present application is a U.S. National Stage filing under 35 U.S.C. §371 of International Application No. PCT/US2013/36986, filed on Apr. 17, 2013.

BACKGROUND

Satisfied users of software applications, e.g., online games, often want to share their positive experience with their family members, friends, and/or fellows. Rapid growth of social networking services (e.g., Facebook®, Twitter®, etc.) have made it possible for such users to share their experiences with certain applications with online acquaintances (e.g., friends, followers, etc.) by sending invitations for the online acquaintances to use, download, install, and/or execute a particular software application. When an invitee is interested in the software application, he/she may accept the invitation; while when the invitee is not interested in the software application, he/she may decline the invitation or not respond to the invitation.

SUMMARY

In an example, an application provider server may include an invitation request receiver unit configured to receive, from an account of a first user, a request to invite a second user to use an application; an interest determination unit configured to determine whether the second user is inclined to use the application based at least in part on behavior information regarding activity in an account of the second user that includes a number of invitations sent to the account of the second user that remain pending; a notification generation unit configured to generate an invitation to be sent to the account of the second user after the interest determination unit determines that the second user is inclined to use the application; and a notification transmitter unit configured to transmit the generated invitation to the account of the second user.

In another example, a method performed under control of an application provider server may include receiving, from an account of a first user, a request to invite a second user to use an application provided by the application provider server; determining whether the second user is inclined to use the application based at least in part on behavior information regarding activity in an account of the second user; and providing the account of the second user with an invitation to use the application, when a result of the determining indicates that the second user is inclined to use the application. In the example, the behavior information regarding the account of the second user may indicate a number of invitations sent to the account of the second user and remain pending.

In yet another example, a computer-readable storage medium may store thereon computer-executable instructions that, in response to execution, cause a processor to perform operations, including counting a number of invitations to use an application that have been sent to an account of a user and remain pending; and registering indifference of the user to the application when the counted number exceeds a predetermined threshold value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
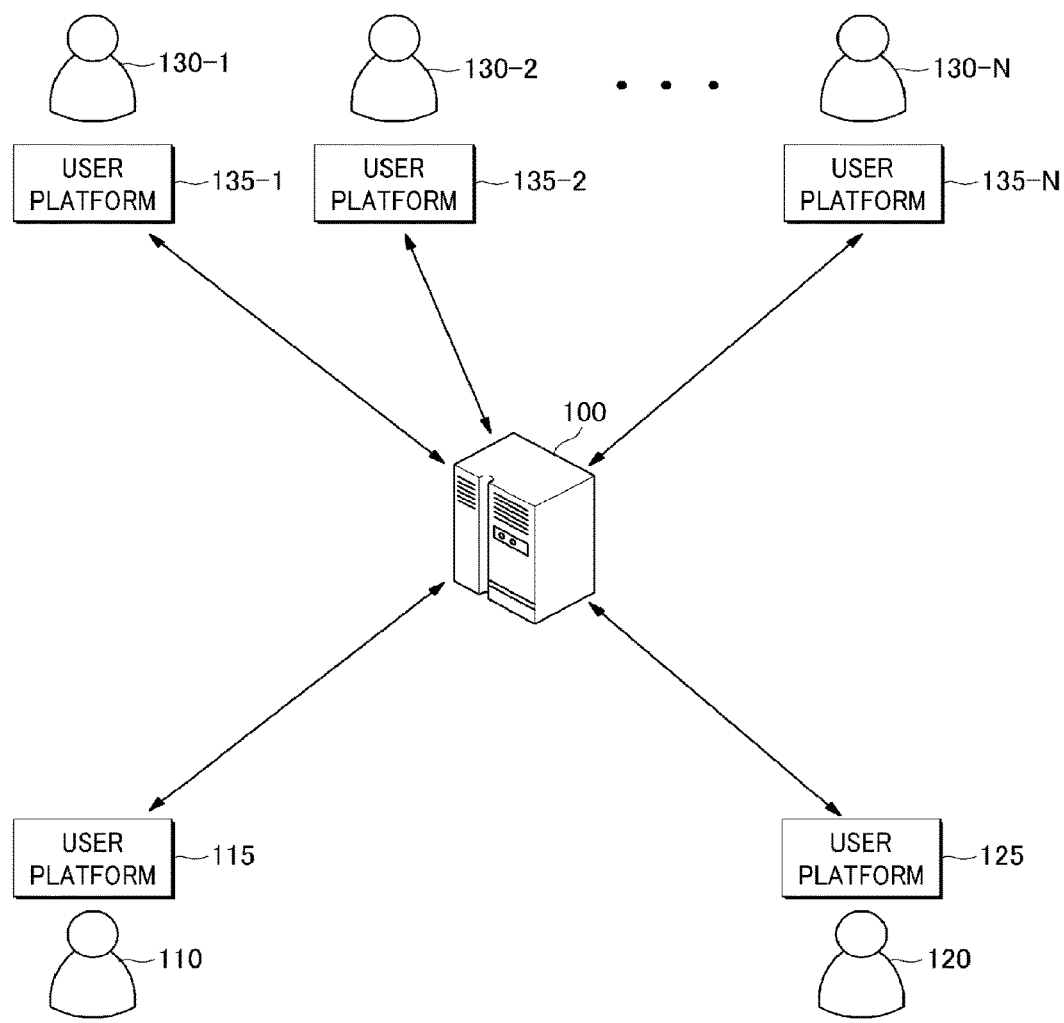
FIG. 1 schematically shows an illustrative example of an invitation management scheme based on user behavior, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to an application provider server hosted by or in cooperation with a social networking service provider. Further, technologies are herein generally described for an invitation management scheme for the application provider server.

In some examples, the application provider server may receive, from an account of an inviter, a request to invite an invitee to use (e.g., download, install and/or execute, etc.) a particular application, determine whether the invitee is inclined to use the application based at least in part on the invitee's behavior, and generate an invitation to be sent to an account of the invitee when determining that the invitee is inclined to use the application. The application provider server may be hosted by or in cooperation with the social networking service provider, which provides users with a social networking service, and may have access to contact information of the users, so as to use the contact information to distribute invitations for others to use the application. That is, in some examples, the application provider server may receive, from the social networking service provider, information regarding the account of the invitee of the social networking service. The application provider server may then send the generated invitation to the account of the invitee. In some alternative examples, the application provider server may request the social networking service provider to relay the generated invitation to the account of the invitee.

In some examples, the invitee's behavior may be determined by activity associated with the account of the invitee, such as a number of pending invitations associated with the account of the invitee. That is, when other users have requested that the application provider server invite the invitee to use a particular application and the application provider server has sent one or more invitations to the invitee in response thereto, but the invitee has not provided any response to the invitations, the application provider server may determine that the invitee is not inclined to use the application.

In some other examples, the application provider server may count a cumulative number of invitations that have been sent to the account of the invitee but remain pending. In still other examples, the application provider server may count a number of invitations that have been sent to the account of the invitee during a predetermined period of time (e.g., for a week, for two weeks, for a month, etc.) but remain pending. In yet other examples, the application provider server may count a number of invitations that have been viewed or seen by the invitee but remain pending.

Then, in some further examples, the application provider server may compare the number of pending invitations (i.e., at least one of the cumulative number of invitations that have been sent to the account of the invitee but remain pending, the number of invitations that have been sent to the account of the invitee during a predetermined period of time but remain pending, or the number of invitations that have been viewed or seen by the invitee but remain pending) with a corresponding predetermined threshold value indicative of an inclination to at least eventually use the application. In such cases, the application provider server may generate a new invitation to send to the account of the invitee when the number of pending invitations is less than the predetermined threshold value.

In some examples, the predetermined threshold value of pending invitations in a user, i.e., invitee's account indicative of an inclination to eventually use a particular application may be a number (e.g., any positive number such as 3, 5, 10, 15, etc.) that is set and/or adjusted by the application provider server based on, at least, popularity of the application, popularity of the social networking service, and/or average responsiveness of users of the social networking service, etc.

In some further examples, the aforementioned predetermined threshold value may also be varied depending on the invitee's past rate of accepting invitations to use applications of a relevant type. Accordingly, the predetermined threshold value may be varied based on, at least, a number of pending invitations sent to the invitee not only for the particular application but also for other relevant applications. For instance, the other relevant applications may be of the same and/or similar type, category, genre, etc. Further to the example, when the particular application is a game application, the predetermined threshold value may be varied based on, at least, a number of pending invitations for all game applications. Thus, when the particular application is a game application and the application provider server at least statistically determines that the invitee tends to not respond to invitations for game applications overall, the application provider server may lower the predetermined threshold value for the particular application.

In some examples, when the application provider server at least statistically determines that the invitee is not inclined to use the application, the application provider server may generate a notification to be sent to the inviter. The notification to be sent to the inviter may include a notification indicating that the invitee is not inclined to use the application and/or a notification indicating the number of invitations that remain pending for the account of the invitee.

In some examples, the application provider server may retrieve contact information regarding the account of the invitee from a database that stores the contact information, and transmit the invitation in accordance with the retrieved contact information of the invitee. The database may be maintained by the social networking service provider or, alternatively, the application provider server may retrieve the contact information from a local data storage.

In some examples, the invitation and/or the notification may be transmitted as at least one of an e-mail, an SMS (short message service) message, an SNS (social networking service) message, and an IMS (instant message service) message.

FIG. 1 schematically shows an illustrative example of an invitation management scheme based on user behavior, arranged in accordance with at least some embodiments described herein.

As depicted, an application provider server 100 may interact or communicate with users 110, 120, 130-1, 130-2, . . . , and 130-N respectively via user platforms 115, 125, 135-1, 135-2, . . . , and 135-N. User platforms 115, 125, 135-1, 135-2, . . . , and 135-N may be of any type of electronic device configured to store, retrieve, compute, transmit and/or receive data, including, for example, a smartphone, a mobile phone, a personal digital assistant (PDA), a tablet, a laptop computer, a desktop computer, etc. Application provider server 100 may communicate with user platforms 115, 125, 135-1, 135-2, . . . , and 135-N via a network such as, for example, the Internet, a cellular network, a wide area network (WAN), a metropolitan area network (MAN), a local area network (LAN), a campus area network (CAN), a virtual private network (VPN), etc. Although the below description describes that application provider server 100 and/or user platforms 115, 125, 135-1, 135-2, . . . , and 135-N perform several operations and/or functions in accordance with at least some embodiments, those skilled in the art will recognize that computer programs or program modules hosted by the respective entities may perform the operations and/or functions described herein.

In some embodiments, application provider server 100 may be hosted by or in cooperation with a social networking service provider (not shown). The social networking service provider may provide users 110, 120, 130-1, 130-2, ..., and 130-N with a social networking service, and may have access to contact information of users 110, 120, 130-1, 130-2, ..., and 130-N, such as e-mail addresses, phone numbers, and so on. Then, application provider server 100 may use the contact information of one or more of users 110, 120, 130-1, 130-2, ..., and 130-N to distribute invitations to use, download, install, and/or execute an application to users 110, 120, 130-1, 130-2, ..., and 130-N.

In some example embodiments, when user 110 sends, to application provider server 100 via user platform 115, a request to invite user 120 to use (e.g., download, install and/or execute, etc.) a particular application, application provider server 100 may determine whether user 120 is inclined to use the application based at least in part on behavior information regarding activity associated with an account of user 120 to which the invitation is sent.

By way of example, but not limitation, application provider server 100 may take into consideration of a number of invitations sent to the account of user 120 that remain pending as the behavior information associated with the account of user 120 to which the invitation is sent. For example, when application provider server 100 has sent, to an account associated with user 120, N previous invitations based on requests from users 130-1, 130-2, ..., 130-N, but there have not been any responses to any of the N previous invitations by the account associated with user 120, application provider server 100 may determine that user 120 is not inclined to use the application. More generally, application provider server 100 may determine whether user 120 is inclined to use an application to which user 102 is invited to download, install, and/or execute based on, at least, a comparison between N and a predetermined threshold value indicative of an inclination to use such an application. Thus, application provider server 100 may determine that user 120 is inclined to use the application when N is less than the predetermined threshold value, while application provider server 100 may determine that user 120 is not inclined to use the application when N is greater than or equal to the predetermined threshold value.

By way of another example, but not limitation, application provider server 100 may take into consideration a number of invitations sent to the account of user 120 during a predetermined period of time and remain pending, as the behavior information associated with the account of user 120. For example, it may be assumed that application provider server 100 has sent to the account of user 120 M previous invitations during the predetermined period of time (e.g., for a week, for two weeks, for a month, etc.), even though a total cumulative number of invitations that have been sent to the account of user 120 is greater than M. In such cases, when the account associated with user 120 has not provided any response to the M previous invitations, application provider server 100 may determine whether user 120 is inclined to use the application based at least in part on comparison between M and a predetermined threshold value indicative of an inclination to use the application. That is, application provider server 100 may determine that user 120 is inclined to use the application when M is less than the predetermined threshold value, while application provider server 100 may determine that user 120 is not inclined to use the application when M is greater than or equal to the predetermined threshold value.

By way of yet another example, but not limitation, application provider server 100 may take into consideration of a number of invitations sent to the account of user 120, viewed or seen by user 120, and remain pending, as the behavior information associated with the account of user 120. For example, it may be assumed that user 120 has viewed L previous invitations received from application provider server 100, even though a number of invitations that has been sent to the account of user 120 is greater than L. In such cases, when user 120 has not provided any response to the L previous invitations, application provider server 100 may determine whether user 120 is inclined to use the application based at least in part on comparison between L and a predetermined threshold value indicative of an inclination to use the application. That is, application provider server 100 may determine that user 120 is inclined to use the application when L is less than the predetermined threshold value, while application provider server 100 may determine that user 120 is not inclined to use the application when L is greater than or equal to the predetermined threshold value.

In some example embodiments, when application provider server 100 determines that user 120 is inclined to use the application, application provider server 100 may generate an invitation to be sent to the account of user 120. Then, application provider server 100 may transmit the generated invitation to the account of user 120. By way of example, but not limitation, application provider server 100 may transmit the invitation in a form of at least one of an e-mail, an SMS (short message service) message, an SNS (social networking service) message, and an IMS (instant message service) message using the contact information that may be retrieved from a database maintained by the social networking service provider.

Further, in some example embodiments, when application provider server 100 determines that user 120 is not inclined to use the application, application provider server 100 may generate a notification to be sent to the account of user 110 who originally sent the request for the invitation to be provided to user 120. For example, application provider server 100 may generate a notification indicating that user 120 is not inclined to use the application and/or a notification indicating the number of invitations that remain pending for the account of user 120. Then, application provider server 100 may transmit the generated notification to the account of user 110. By way of example, but not limitation, application provider server 100 may transmit the notification in a form of at least one of an e-mail, an SMS (short message service) message, an SNS (social networking service) message, and an IMS (instant message service) message.

Figure 2:
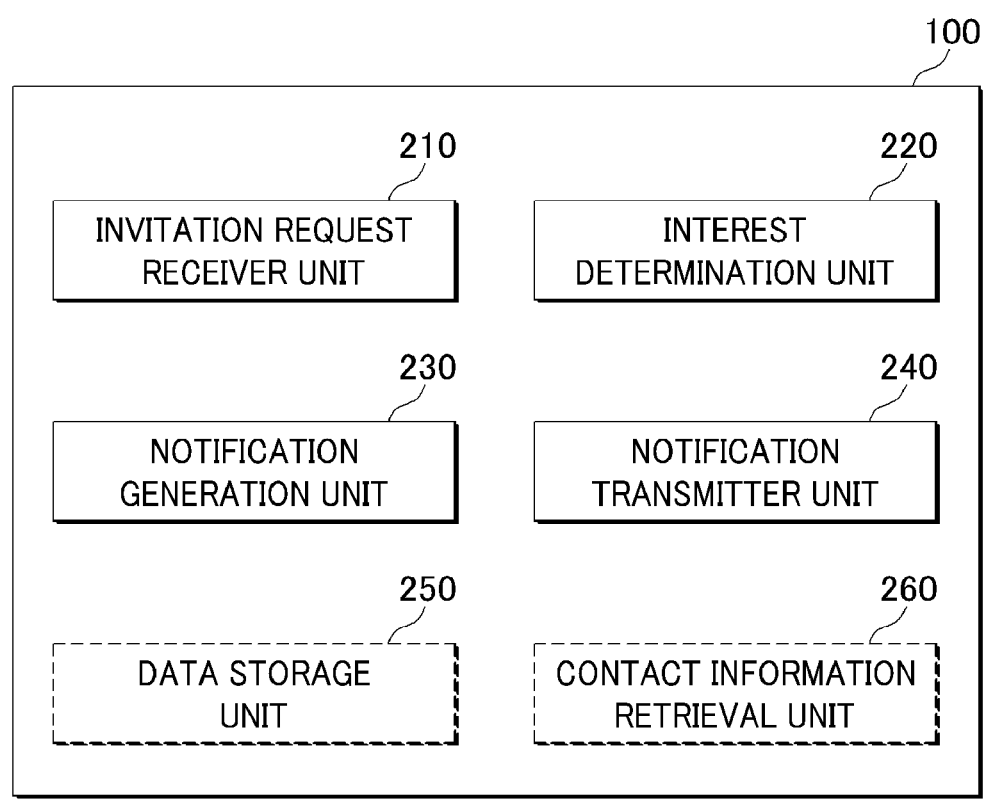
FIG. 2 shows a schematic block diagram illustrating an example architecture of an application provider server for implementing an invitation management scheme, arranged in accordance with at least some embodiments described herein.

FIG. 2 shows a schematic block diagram illustrating an example architecture of application provider server 100 for implementing an invitation management scheme, arranged in accordance with at least some embodiments described herein.

As depicted, application provider server 100 may include an invitation request receiver unit 210, an interest determination unit 220, a notification generation unit 230, and a notification transmitter unit 240. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Invitation request receiver unit 210 may be configured to receive, from an account of a first user (e.g., user 110 in FIG. 1), a request to invite a second user (e.g., user 120 in FIG. 1) to use a particular application.

Interest determination unit 220 may be configured to determine whether the second user is inclined to use the application based at least in part on behavior information regarding activity in an account associated with the second user, at which the invitation to use the application is received. The behavior information may pertain to activity associated with a number of invitations sent to the account of the second user that remain pending.

In some embodiments, interest determination unit 220 may be configured to count a number of invitations that have been sent to the account of the second user and remain pending, and to determine whether the second user is inclined to use the application based at least in part on comparison between the counted number and a predetermined threshold value indicative of an inclination to use the application. In some other embodiments, interest determination unit 220 may be configured to count a number of invitations that have been sent to the account of the second user during a predetermined period of time and remain pending, and determine whether the second user is inclined to use the application based at least in part on comparison between the counted number and a predetermined threshold value. In yet some other embodiments, interest determination unit 220 may be configured to count a number of invitations that have been viewed or seen by the second user and remain pending, and determine whether the second user is inclined to use the application based at least in part on comparison between the counted number and a predetermined threshold value.

Notification generation unit 230 may be configured to generate an invitation to be sent to the account of the second user when interest determination unit 220 determines that the second user is inclined to use the application. Notification generation unit 230 may be further configured to generate a notification indicating that the second user is not inclined to use the application and/or a notification indicating the number of invitations that remain pending for the account of the second user when interest determination unit 220 determines that the second user is not inclined to use the application.

Notification transmitter unit 240 may be configured to transmit, to the account of the second user, the invitation generated by notification generation unit 230. Notification transmitter unit 240 may be further configured to transmit, to the account of the first user, the notification generated by notification generation unit 230. In some embodiments, notification transmitter unit 240 may be configured to transmit the invitation and/or the notification in a form of at least one of an e-mail, an SMS (short message service) message, an SNS (social networking service) message, and an IMS (instant message service) message.

In some embodiments, application provider server 100 may optionally further include a data storage unit 250 configured to store contact information regarding the account of the second user. In some other embodiments, application provider server 100 may optionally further include a contact information retrieval unit 260 configured to retrieve contact information regarding the account of the second user from a database which may be maintained by a social networking service provider.

Figure 3:
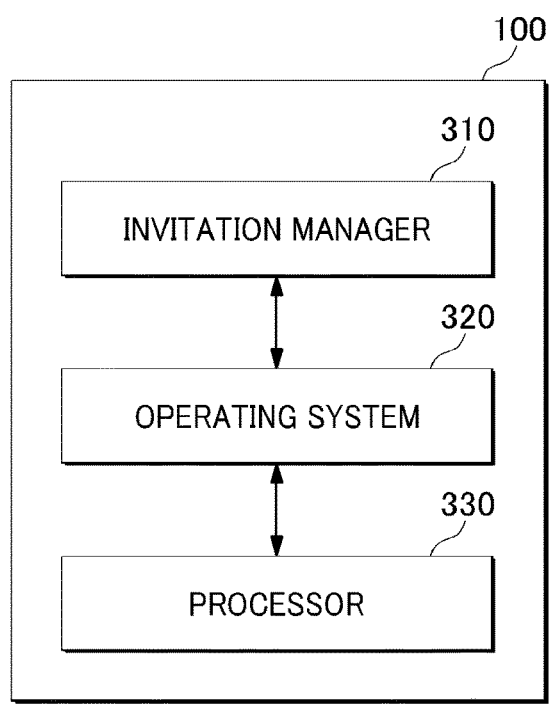
FIG. 3 shows a schematic block diagram illustrating another example architecture of an application provider server for implementing an invitation management scheme, arranged in accordance with at least some embodiments described herein.

FIG. 3 shows a schematic block diagram illustrating another example architecture of application provider server 100 for implementing an invitation management scheme, arranged in accordance with at least some embodiments described herein.

As depicted, application provider server 100 may include an invitation manager 310, an operating system 320 and a processor 330. Invitation manager 310 may be an application adapted to operate on operating system 320 such that the invitation management scheme as described herein may be provided. Operating system 320 may allow invitation manager 310 to manipulate processor 330 to implement the invitation management scheme as described herein.

Figure 4:
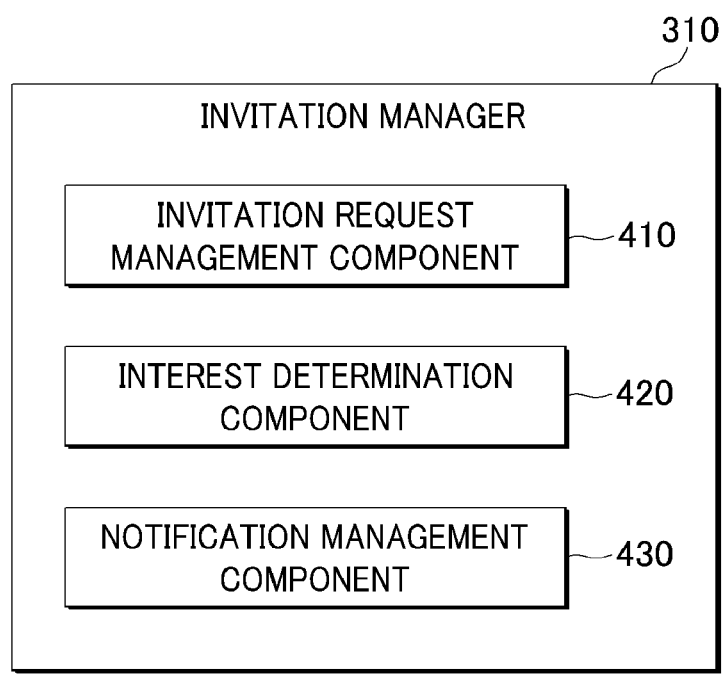
FIG. 4 shows a schematic block diagram illustrating an example architecture of an invitation manager for implementing an invitation management scheme, arranged in accordance with at least some embodiments described herein.

FIG. 4 shows a schematic block diagram illustrating an example architecture of invitation manager 310 for implementing an invitation management scheme, arranged in accordance with at least some embodiments described herein.

As depicted, invitation manager 310 may include an invitation request management component 410, an interest determination component 420, and a notification management component 430.

Invitation request management component 410 may be adapted to manage a request from an account of a first user (e.g., user 110 in FIG. 1) to invite a second user (e.g., user 120 in FIG. 1) to use a particular application.

Interest determination component 420 may be adapted to determine whether the second user is inclined to use the application based at least in part on behavior information regarding activity in an account associated with the second user, at which the invitation to use the application is received. The behavior information may pertain to activity associated with a number of invitations sent to the account of the second user that remain pending.

Notification management component 430 may be adapted to generate an invitation to be sent to the account of the second user when interest determination component 420 determines that the second user is inclined to use the application. Notification management component 430 may be further configured to generate a notification indicating that the second user is not inclined to use the application and/or a notification indicating the number of invitations that remain pending for the account of the second user when interest determination component 420 determines that the second user is not inclined to use the application.

Figure 5:
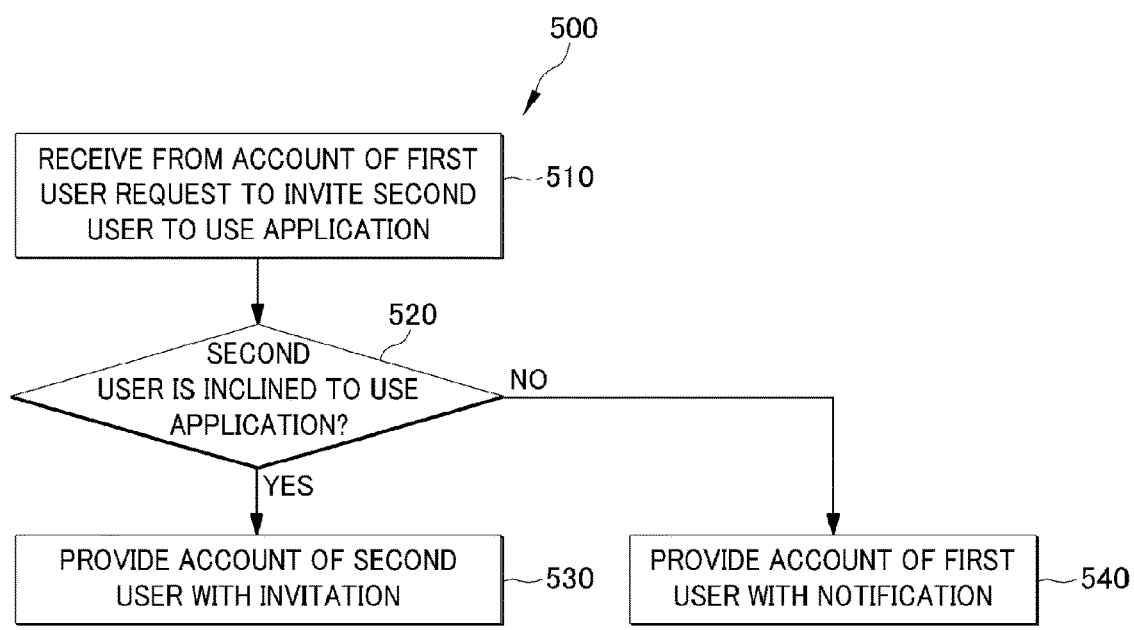
FIG. 5 shows an example flow diagram of a process for an application provider server implementing an invitation management scheme, arranged in accordance with at least some embodiments described herein.

FIG. 5 shows an example flow diagram of a process 500 for an application provider server implementing an invitation management scheme, arranged in accordance with at least some embodiments described herein.

Process 500 may be implemented in an application provider server such as application provider server 100 including invitation request receiver unit 210, interest determination unit 220, notification generation unit 230, and notification transmitter unit 240. Process 500 may also be implemented by computer programs or program modules that are adapted to provide the invitation management scheme and hosted by an application provider server, such as invitation manager 310 including invitation request management component 410, interest determination component 420, and notification management component 430. Process 500 may include one or more operations, actions, or functions as illustrated by one or more blocks 510, 520, 530 and/or 540. Although illustrated as discrete blocks, various blocks may be divided into additional blocks, combined into fewer blocks, or eliminated, depending on the desired implementation. Processing may begin at block 510.

At block 510 (Receive from Account of First User Request to Invite Second User to Use Application), application provider server 100 (e.g., invitation request receiver unit 210) and/or invitation manager 310 (e.g., invitation request management component 410) may receive, from an account of a first user (e.g., user 110 in FIG. 1), a request to invite a second user (e.g., user 120 in FIG. 1) to use a particular application. Processing may continue from block 510 to decision block 520.

At decision block 520 (Second User is Inclined to Use Application?), application provider server 100 (e.g., interest determination unit 220) and/or invitation manager 310 (e.g., interest determination component 420) may determine whether the second user is inclined to use the application based at least in part on behavior information regarding activity associated with an account of the second user. The behavior information regarding the activity associated with the account of the second user may be determined based on, e.g., a cumulative number of invitations that have been sent to the account of the second user and remain pending, a number of invitations that have been sent to the account of the second user during a predetermined period of time and remain pending, and/or a number of invitations that have been viewed by the second user and remain pending. When application provider server 100 and/or invitation manager 310 determines that the second user is inclined to use the application, processing may continue from decision block 520 to block decision 530. Otherwise, processing may continue from decision block 520 to block 540.

At block 530 (Provide Account of Second User with Invitation), application provider server 100 (e.g., notification generation unit 230 and/or notification transmitter unit 240) and/or invitation manager 310 (e.g., notification management component 430) may provide the account of the second user with an invitation to use the application. By way of example, but not limitation, application provider server 100 and/or invitation manager 310 may send to the account of the second user the invitation in a form of at least one of an e-mail, an SMS (short message service) message, an SNS (social networking service) message, and an IMS (instant message service) message.

At block 540 (Provide Account of First User with Notification), application provider server 100 (e.g., notification generation unit 230 and/or notification transmitter unit 240) and/or invitation manager 310 (e.g., notification management component 430) may provide the account of the first user with a notification indicating that the second user is not inclined to use the application and/or a notification indicating a number of invitations that remain pending. By way of example, but not limitation, application provider server 100 and/or invitation manager 310 may send the account of the first user the notification in a form of at least one of an e-mail, an SMS (short message service) message, an SNS (social networking service) message, and an IMS (instant message service) message.

As such, application provider server 100 and/or invitation manager 310 may stop or restrain sending the second user invitations to use the application, when determining that the second user is not inclined to use the application, thereby improving quality of experience (QoE) with a service of application provider server 100 and/or a social networking service associated with application provider server 100.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
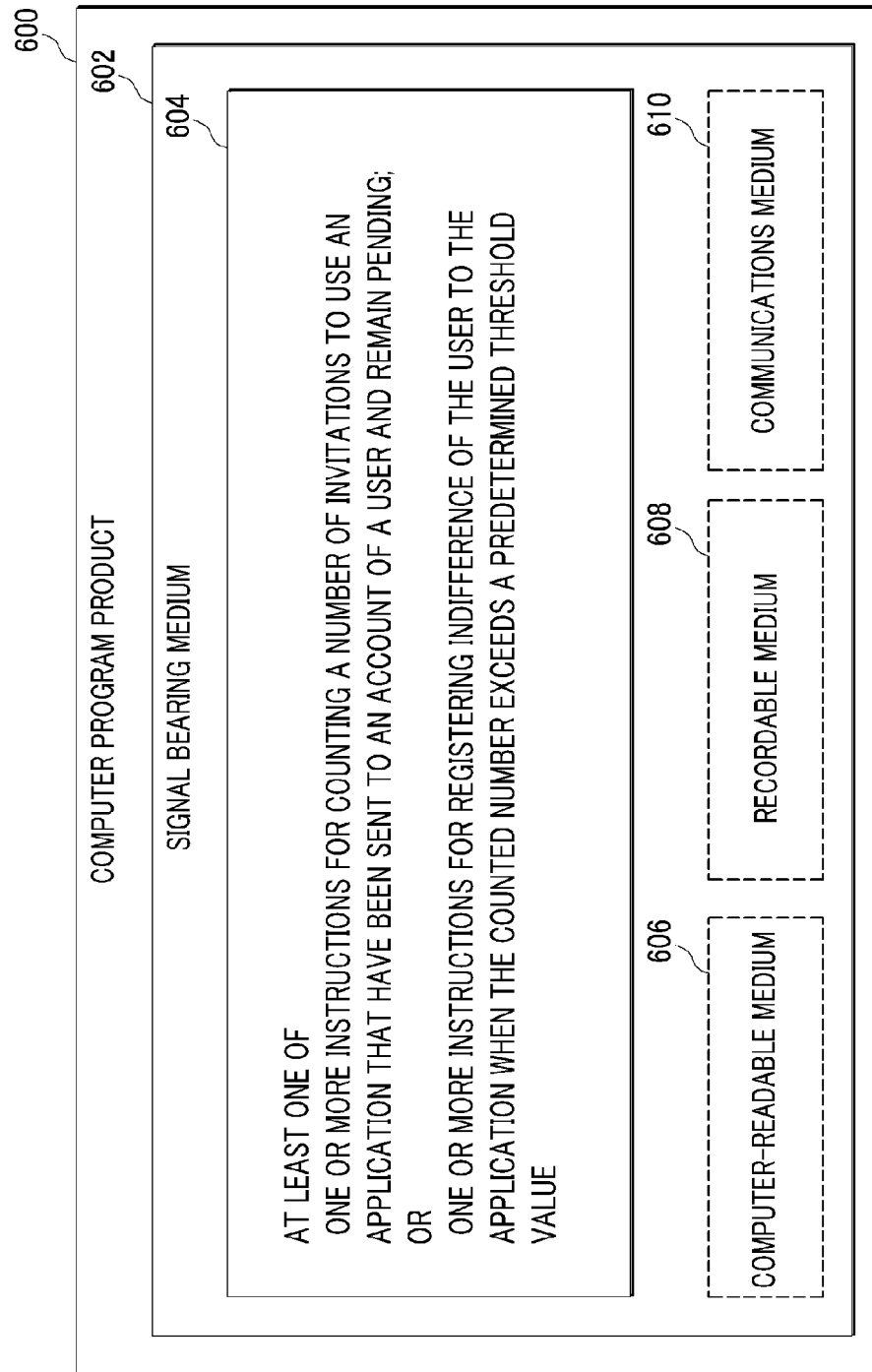
FIG. 6 illustrates an example computer program product that may be utilized to implement an invitation management scheme, arranged in accordance with at least some embodiments described herein.

FIG. 6 illustrates an example computer program product 600 that may be utilized to implement an invitation management scheme, arranged in accordance with at least some embodiments described herein.

Computer program product 600 may be hosted by an application provider server, such as application provider server 100. As depicted, computer program product 600 may include a signal bearing medium 602. Signal bearing medium 602 may include one or more instructions 604 that, when executed by, for example, a processor, may provide the functionality described above with respect to FIGS. 1-5. By way of example, instructions 604 may include: one or more instructions for counting a number of invitations to use an application that have been sent to an account of a user and remain pending; or one or more instructions for registering indifference of the user to the application when the counted number exceeds a predetermined threshold value. Thus, for example, referring to FIGS. 2-4, application provider server 100 and/or invitation manager 310 may undertake one or more of the blocks shown in FIG. 5 in response to instructions 604.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to one or more modules of application provider server 100 and/or invitation manager 310 by an RF signal bearing medium 602, where the signal bearing medium 602 is conveyed by a wireless communications medium 610 (e.g., a wireless communications medium conforming with the IEEE 802.11 standard).

Figure 7:
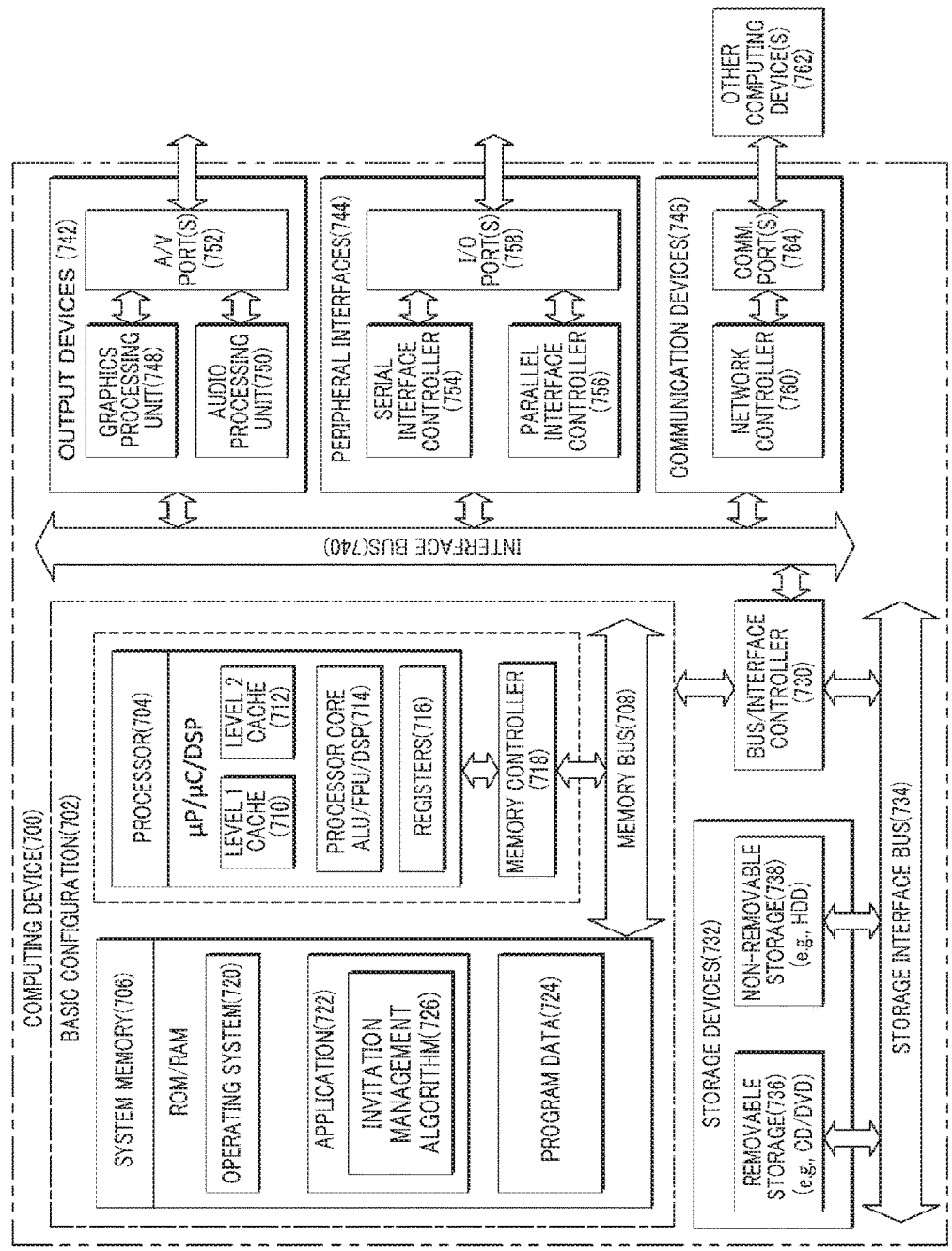
FIG. 7 is a block diagram illustrating an example computing device that may be utilized to implement an invitation management scheme, arranged in accordance with at least some embodiments described herein.

FIG. 7 is a block diagram illustrating an example computing device 700 that may be utilized to implement an invitation management scheme, arranged in accordance with at least some embodiments described herein.

In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), nonvolatile memory (such as ROM, flash memory, etc.) or any combination thereof. System memory 706 may include an operating system 720, one or more applications 722, and program data 724.

Application 722 may include an invitation management algorithm 726 that may be arranged to perform the functions as described herein including the actions described with respect to the application provider server 100 architecture as shown in FIGS. 2-3 or including the actions described with respect to the flow charts shown in FIG. 5. Program data 724 may include any data that may be useful for providing the invitation management scheme as is described herein. In some examples, application 722 may be arranged to operate with program data 724 on an operating system 720 such that the invitation management scheme as described herein may be provided.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A computer-based application provider server, comprising:
   an invitation request receiver unit comprising logic configured to cause the server to receive, from an account of a first user, a request to invite a second user to use an application that has not been used by the second user;
   an interest determination unit comprising logic configured to determine whether the second user is inclined to use the application based at least in part on behavior information regarding activity in an account of the second user that indicates a number of invitations sent to the account of the second user to use the application that have been declined;
   a notification generation unit comprising logic configured to generate an invitation to be sent to the account of the second user in response to logic corresponding to the interest determination unit determining that the second user is inclined to use the application; and
   a notification transmitter unit comprising logic configured to transmit the generated invitation to the account of the second user in response to the determination that the second user is inclined to use the application.

2. The application provider server of claim 1, wherein the interest determination unit further comprises logic configured to:
   count a number of invitations that have been sent to the account of the second user to use the application that have been declined, and
   determine whether the second user is inclined to use the application based at least in part on comparison between the counted number and a threshold value indicative of an inclination to use the application.

3. The application provider server of claim 1, wherein the behavior information regarding the activity in the account of the second user further indicates a number of invitations that have been sent to the account of the second user to use the application during a period of time and remain pending.

4. The application provider server of claim 1, wherein the behavior information regarding the activity in the account of the second user further indicates a number of invitations that have been viewed by the second user to use the application and remain pending.

5. The application provider server of claim 1,
   wherein the notification generation unit further comprises logic configured to generate a notification indicating that the second user is not inclined to use the application, and
   wherein the notification transmitter unit further comprises logic configured to transmit the notification to the account of the first user.

6. The application provider server of claim 1,
   wherein the notification generation unit further comprises logic configured to generate a notification indicating the number of invitations sent to the account of the second user to use the application that have been declined, and
   wherein the notification transmitter unit further comprises logic configured to transmit the notification to the account of the first user.

7. The application provider server of claim 1, wherein the notification transmitter unit further comprises logic configured to transmit the invitation in a form of at least one of an e-mail, an SMS (short message service) message, an SNS (social networking service) message, and an IMS (instant message service) message.

8. The application provider server of claim 1, further comprising:
a data storage unit comprising logic configured to store contact information regarding the account of the second user.

9. The application provider server of claim 1, further comprising:
a contact information retrieval unit comprising logic configured to retrieve, from a database, contact information regarding the account of the second user.

10. The application provider server of claim 9, wherein the database is maintained by a social networking service provider.

11. The application provider server of claim 1, wherein the application provider server is hosted by a social networking service provider.

12. A computer-implemented method performed under control of an application provider server, comprising:
receiving, from an account of a first user, a request to invite a second user to use an application provided by the application provider server that has not been used by the second user;
determining whether the second user is inclined to use the application based at least in part on behavior information regarding activity in an account of the second user; and
providing the account of the second user with an invitation to use the application, in response to the determination that the second user is inclined to use the application,
wherein the behavior information regarding the account of the second user indicates a number of invitations sent to the account of the second user to use the application that have been declined.

13. The method of claim 12, further comprising:
counting a number of invitations that have been sent to the account of the second user to use the application that have been rejected; and
comparing the counted number with a predetermined threshold value,
wherein the determining includes determining that the second user is inclined to use the application when the counted number is less than the threshold value.

14. The method of claim 12, wherein the behavior information regarding the activity in the account of the second user indicates a number of invitations that have been sent to the account of the second user to use the application during a period of time and remain pending.

15. The method of claim 12, wherein the behavior information regarding the activity in the account of the second user further indicates a number of invitations that have been viewed by the second user to use the application and remain pending.

16. The method of claim 12, further comprising:
providing the account of the first user with a notification indicating that the second user is not inclined to use the application, when the result of the determining indicates that the second user is not inclined to use the application.

17. The method of claim 12, further comprising:
providing the account of the first user with a notification indicating a number of invitations to use the application that remain pending, when the result of the determining indicates that the second user is not inclined to use the application.

18. The method of claim 12, wherein the providing includes sending to the account of the second user the invitation in a form of at least one of an e-mail, an SMS (short message service) message, an SNS (social networking service) message, and an IMS (instant message service) message.

19. A computer-readable storage medium having stored thereon computer-executable instructions that, in response to execution, cause a processor to perform operations, comprising:
counting a number of invitations to use an application that have been sent to an account of a user that have been rejected; and
registering indifference of the user to the application when the counted number exceeds a threshold value and the number of invitations is greater than one.

20. The computer-readable storage medium of claim 19, wherein the operations further comprise:
receiving a request to invite the user to use the application from another account; and
providing the other account with an indifference notification indicating that the user is indifferent to the application, when the indifference of the user is registered.

21. The computer-readable storage medium of claim 19, wherein the operations further comprise:
receiving a request to invite the user to use the application from another account; and
providing the other account with an indifference notification indicating the counted number of invitations that remain pending.

* * * * *